United States Patent Office 3,478,114
Patented Nov. 11, 1969

3,478,114
PROCESS FOR MAKING α-SANTALOL
Ronald G. Lewis and William F. Erman, Cincinnati, Ohio, assignors to The Procter & Gamble Company, Cincinnati, Ohio, a corporation of Ohio
No Drawing. Filed May 13, 1966, Ser. No. 549,795
Int. Cl. C07c 35/22
U.S. Cl. 260—631.5    8 Claims

ABSTRACT OF THE DISCLOSURE

A process for the preparation of α-santalol, and certain novel α-santalate esters, in which tricycloekasantalal is used as the starting material are disclosed. α-Santalol and the α-santalate esters are useful in perfume compositions.

This invention relates to a process for preparing α-santalol, and to certain novel α-santalate esters which are obtained as a part of said process. More specifically, the invention involves a total synthesis of α-santalol utilizing tricycloekasantalal as the starting material and alkyl α-santalate as a principal intermediate.

α-Santalol is a highly valued perfume base and is used in large quantities throughout the world. Heretofore, the only practical method for obtaining α-santalol was to isolate it from naturally occurring sources, e.g., from East Indian sandalwood oil, a primary source of α-santalol. See for example, Bradfield et al., Journal of the Chemical Society (British), 79, p. 390 (1935). However, the supply of East Indian sandalwood oil and other sources of α-santalol is limited and a possible shortage in the foreseeable future is predicted. So far as is known, the present invention provides the first practical synthesis of α-santalol.

It has been generally accepted in the prior art that α-santalol, isolated from naturally occurring sources, exists exclusively in the form of trans α-santalol. See, for example, G. Brieger, Tetrahedron Letters, 2123 (1963). Compared with the products of the present invention on the basis of advanced analytical techniques, α-santalol isolated from naturally occurring sources appears to be cis α-santalol. By means of this invention, however, trans α-santalol, cis α-santalol, or a mixture of these two isomers, can be selectively synthesized as desired.

Accordingly, it is a primary object of this invention to provide a process for preparing α-santalol.

It is a more specific object of this invention to provide a process for preparing trans α-santalol.

It is another more specific object of this invention to provide a process for preparing cis α-santalol.

It is a further object of this invention to provide the novel compounds alkyl trans α-santalate, alkyl cis α-santalate, and mixtures thereof.

These and other objects are achieved by a process for preparing α-santalol, which comprises:

(A) reacting tricycloekasantalal with a phosphorane to form alkyl α-santalate; and (B) reacting the alkyl α-santalate with a reducing agent to form α-santalol.

In the above-described process and otherwise as used herein, the term "alkyl α-santalate" refers to alkyl trans α-santalate, alkyl cis α-santalate, and mixtures thereof wherein alkyl is selected from the group consisting of methyl, ethyl, propyl, butyl, and pentyl. This invention's process for the preparation of a α-santalol is illustrated schematically in FIGURE 1 for a preferred embodiment of this invention, i.e., where alkyl is ethyl.

FIGURE 1

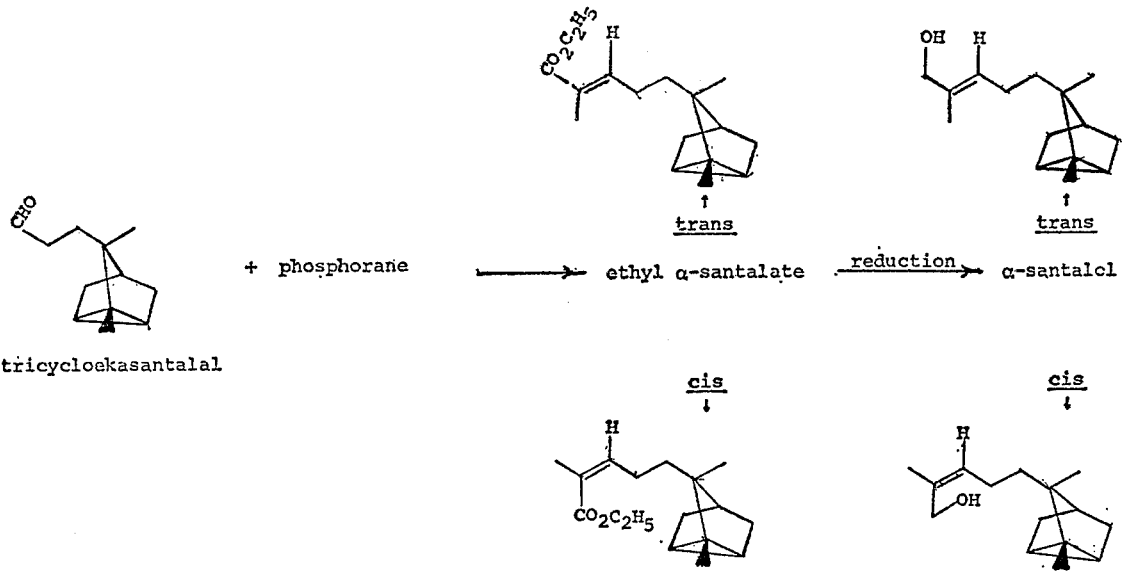

The starting material in the above-illustrated process, tricycloekasantalal, is a known compound and can be conveniently prepared by the process described in the U.S. patent application of William F. Erman, Ronald G. Lewis and David H. Gustafson, filed concurrently herewith.

As used herein, the term "phosphorane" refers to a compound having the general formula $$R^2-\overset{\overset{\displaystyle R^1}{|}}{P}=\overset{\overset{\displaystyle }{|}}{C}-CO_2R^4$$
$$\overset{|}{R^3}\;\overset{|}{CH_3}$$

wherein $R^1$, $R^2$ and $R^3$ are each selected from the group consisting of alkyl, aryl, alkylaryl, arylalkyl, alkoxy, and aryloxy containing from 1 to about 20 carbon atoms and the total number of carbon atoms in $R^1$, $R^2$ and $R^3$ is less than about 30; and $R^4$ is an alkyl radical of from 1 to 5 carbon atoms. ($R^4$ in the phosphorane corresponds to alkyl in the alkyl α-santalate intermediate discussed above.) Preferably, $R^1$, $R^2$ and $R^3$ are aryl, more preferably phenyl, and $R^4$ is ethyl. Particularly preferred phosphorane compounds within this group are (carboalkoxyethylidene)-triarylphosphoranes, e.g., (carbethoxyethylidene)-triphenylphosphorane:

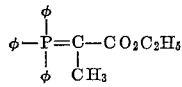

Preferably, the reaction of tricycloekasantalal with phosphorane is carried out in a solvent selected from the group consisting of monohydric alcohols, preferably having from 1 to about 8 carbon atoms, such as methanol, ethanol, and octanol; dihydric alcohols, preferably having from 1 to about 8 carbon atoms such as triethylene glycol and ethylene glycol; alkyl halides, preferably having from 1 to 4 carbon atoms such as methylene chloride, chloroform, monochloroethane, and dichloroethane; ethers, preferably of from 4 to 10 carbon atoms, most preferably cyclic monooxy ethers such as tetrahydrofuran, cyclic dioxy ethers such as dioxane, and aliphatic dioxy ethers such as ethylene glycol dimethyl ether and diethylene glycol dimethyl ether; amides, preferably amides of carboxylic acids containing from 1 to about 6 carbon atoms, such as dimethylformamide, diethylformamide, dimethylacetamide, and diethylacetamide; sulfoxides, preferably dialkyl sulfoxides of from 2 to 5 carbon atoms, such as dimethyl sulfoxide and diethyl sulfoxide; and other solvents such as benzene, toluene, and xylene. Mixtures of the above solvents can also be used, e.g., in a 1:1 ratio by weight.

The alkyl α-santalate resulting from the reaction of tricycloekasantalal with the phosphorane comprises a mixture of alkyl trans α-santalate and alkyl cis α-santalate; however, the trans product generally predominates in this mixture. As discussed hereinafter, certain of these alkyl α-santalates are novel compounds which possess a utility separate and distinct from their use as intermediates in the synthesis of α-santalol.

It has been discovered that certain selected solvents influence the relative proportions of the alkyl trans and cis α-santalates comprising the above-mentioned mixture. More specifically, a solvent selected from the group consisting of methylene chloride, chloroform, and ethylene glycol dimethyl ether is preferred to increase the relative proportion of alkyl trans α-santalate. On the other hand, a solvent selected from the group consisting of methanol, ethanol, and dimethylformamide is preferred to increase the relative proportion of alkyl cis α-santalate. Methylene chloride and methanol are preferred solvents to increase the total yield of alkyl α-santalate, irrespective of which cis or trans isomer thereof predominates.

The concentration of tricycloekasantalal in the solvent preferably ranges from about 2% weight per unit volume to about 4% weight per unit volume and the concentration of the phosphorane in the solvent preferably ranges from about 10% weight per unit volume to about 30% weight per unit volume. These concentrations effect homogeneity in the system which is desired. Irrespective of the concentration of the individual reactants in the solvent, the mole ratio of tricycloekasantalal to the phosphorane preferably ranges from about 1:3 to about 1:2.

Temperature is not critical to this reaction and satisfactory results are obtained when the reaction is carried out at about room temperature (25° C.). Preferably, however, the temperature of the reaction mixture is maintained below about 100° C. to avoid the formation of undesirable side products, e.g., compounds such as acylalkylidene triphenylphosphoranes may form at higher temperatures.

Alkyl α-santalate, i.e., the mixture comprising trans and cis isomers of alkyl α-santalate, can be separated from the reaction mixture by conventional extraction, distillation or chromatographic techniques, preferably by extraction with n-hexane, followed by chromatographic purification.

Alkyl α-santalate, as the above-obtained mixture of cis and trans isomers, can be used as the starting material in the next step of the process. In this event, the final α-santalol product will accordingly comprise a mixture of trans α-santalol and cis α-santalol.

Alternatively, the alkyl trans and alkyl cis α-santalates can be separated from each other, preferably by distillation or chromatographic techniques, and each of these isomers can be individually reacted in the subsequent reduction step described hereinafter. This procedure is preferable if cis and trans α-santalol, separately, are the desired ultimate products since the separation of alkyl cis from alkyl trans α-santalate can be more readily effected than the separation of the cis and trans α-santalols.

The next step of the process involves the reduction of alkyl α-santalate to form α-santalol. Satisfactory reducing agents for said reaction are lithium aluminum hydride, lithium borohydride, aluminum hydride, lithium trimethoxyaluminohydride, and sodium borohydride-aluminum trichloride. Lithium aluminum hydride is a preferred reducing agent.

Preferably, this reduction reaction is carried out in an ether solvent, preferably an ether of from 4 to 10 carbon atoms such as diethyl ether, a cyclic monooxy ether such as tetrahydrofuran, a cyclic dioxy ether such as dioxane, or aliphatic dioxy ether such as ethylene glycol dimethyl ether or diethylene glycol dimethyl ether. Tetrahydrofuran and diethyl ether are highly preferred solvents for this reaction. Preferably, the concentration of alkyl α-santalate in the solvent ranges from about 2% weight per unit volume to about 4% weight per unit volume and the concentration of the reducing agent ranges from about 0.05% weight per unit volume to about 1% weight per unit volume. These concentrations effect desired homogeneity in the system.

The temperature of the reduction reaction is preferably maintained below about 30° C. to avoid the formation of hydrogenolysis products, i.e., complete reduction to dihydrosantalene or partial reduction to santalene, and to avoid olefin reduction of the unsaturated compounds involved in the reaction, i.e., reduction to dihydrosantalol. More preferably, the temperature is maintained within the range of from about 15° C. to about 25° C.

It is desirable to carry out the reduction reaction in the presence of an inert gas such as nitrogen or argon.

The α-santalol product can be separated from the reaction mixture by conventional chromatographic and distillation techniques although complete separation of this final product is optional. When this product comprises a mixture of trans α-santalol and cis α santalol, as for example when the alkyl trans and cis α-santalates are reduced as a mixture rather than separately, trans and cis α-santalol are preferably separated from each other by gas-liquid chromatography.

Thus, in summary, this invention provides a process for preparing α-santalol, which comprises:

(A) reacting tricycloekasantalal with a phosphorane to form alkyl α-santalate; and
(B) reacting the alkyl α-santalate with a reducing agent to form α-santalol.

This invention also provides, in summary, a process for preparing trans α-santalol, which comprises:

(A) reacting tricycloekasantalal with a phosphorane to form alkyl trans α-santalate;
(B) separating the alkyl trans α-santalate from the reaction mixture; and
(C) reacting the alkyl trans α-santalate with a reducing agent to form trans α-santalol.

This invention further provides, in summary, a process for preparing cis α-santalol, which comprises:

(A) reacting tricycloekasantalal with a phosphorane to form alkyl cis α-santalate;
(B) separating the alkyl cis α-santalate from the reaction mixture; and
(C) reacting the alkyl cis α-santalate with a reducing agent to form cis α-santalol.

Particular preferred embodiments of the above-described processes are summarized as follows:

For step (A)

The phosphorane is a (carboalkoxyethylidene)-triarylphosphorane, preferably a (carboalkoxyethylidene)-triphenylphosphorane, i.e., a compound selected from the group consisting of (carbomethoxyethylidene)-triphenylphosphorane, (carbethoxyethylidene) - triphenylphosphorane, (carbopropoxyethylidene) - triphenylphosphorane, (carbobutoxyethylidene)-triphenylphosphorane, and (carbopentoxyethylidene)-triphenylphosphorane; the reaction is carried out in a solvent selected from the group consisting of alcohols, alkyl halides, ethers, amides, and sulfoxides, preferably methanol and methylene chloride, more preferably, methanol, ethanol and dimethylformamide for the production of cis products, and methylene chloride, chloroform and ethylene glycol dimethyl ether for the production of trans products; the concentration of tricycloekasantalal in the solvent ranges from about 2% weight per unit volume to about 4% weight per unit volume; the concentration of phosphorane in the solvent ranges from about 10% weight per unit volume to about 30% weight per unit volume; the mole ratio of tricycloekasantalal to phosphorane ranges from about 1:3 to about 1:2; and the temperature is maintained below about 100° C.

For the final step

The reducing agent is selected from the group consisting of lithium aluminum hydride, lithium borohydride, aluminum hydride, lithium trimethoxyaluminohydride, and sodium borohydride-aluminum trichloride, preferably lithium aluminum hydride; the reaction is carried out in a solvent selected from the group consisting of tetrahydrofuran, diethyl ether, dioxane, ethylene glycol dimethyl ether, and diethylene glycol dimethyl ether, preferably tetrahydrofuran or diethyl ether; the concentration of alkyl α-santalate in said solvent ranges from about 2% weight per unit volume to about 4% weight per unit volume; the concentration of the reducing agent ranges from about 0.05% weight per unit volume to about 1% weight per unit volume; the temperature is maintained from about 15° C. to about 25° C.; and, as an additional and optional step, the α-santalol product is separated from the reaction mixture.

Additionally, this invention also provides, as novel compositions of matter, compounds selected from the group consisting of alkyl trans α-santalate, alkyl cis α-santalate and mixtures thereof wherein alkyl is selected from the group consisting of ethyl, propyl, butyl, and pentyl. These compounds or mixtures possess very desirable woody odors reminiscent of the well known patchouli alcohol. Therefore, these santalates have utility in odoriferously effective amounts as components of perfume compositions. For example, a perfume composition for ultimate use in a product such as a soap, detergent, personal deodorant, space deodorant, or the like, containing from about 0.00001% to about 100%, preferably from about 0.001% to about 50% of, e.g., ethyl α-santalate, is highly desirable and useful.

EXAMPLES

The following examples illustrate the invention but are not intended to be limiting. All percentages and ratios in the following examples, as well as in this specification and the appended claims, are by weight unless otherwise indicated.

Data listed in all of the examples were obtained by means of the following instruments and techniques:

Melting points were determined on a Kofler micro hot stage. Boiling points were observed on standard thermometers. Infrared spectra were recorded on a Perkin-Elmer Infracord spectrophotometer. Microanalyses were performed. The n.m.r. spectra were obtained with a Varian Associates A–60 or a Varian Associates HA–100 instrument in deuterated chloroform or carbon disulfide using tetramethylsilane as an internal reference. Gas-liquid chromatograms (g.l.c.) were obtained on an Aerograph Model 200 analytical instrument using one of two columns. Column A: 20% General Electric SF–96 silicone on 60–80 mesh chromosorb with H.M.D.S. (a conventional silicone coating), 10 foot by 0.25 inch outside diameter, column B: 20% Reoplex–400 (a conventional polyester packing) on 60–80 mesh chromosorb with H.M.D.S., 10 foot by 0.25 inch outside diameter. The flow rate in either column was 60 ml. per minute.

EXAMPLE I

Preparation of trans α-santalol

To a solution of 1.53 g. of (carbethoxyethylidene)- triphenylphosphorane in 5 ml. of methylene chloride was added a solution of 340 mg. of tricycloekasantalal in 5 ml. of dry methylene chloride and the resulting solution stirred for 66 hours at room temperature under a nitrogen atmosphere. The methylene chloride was removed under reduced pressure (20–25 mm.), and the remaining residue extracted with six 30 ml. portions of boiling n-hexane. The n-hexane extracts were combined and the total volume was reduced to 50 ml. This material was then passed through 10 g. of activity IV alumina with 500 ml. of n-hexane. The n-hexane was removed under reduced pressure (20–25 mm.) leaving 577 mg. of a light yellow oil. Analysis of this oil on column A at 200° indicated the presence of four major components—a saturated ester by infrared ($R_T$ 200 sec.), an alcohol by infrared ($R_T$ 310 sec.), ethyl -cis-α-santalate ($R_T$ 935 sec.), and ethyl-trans-α-santalate ($R_T$ 1275 sec.). Further purification and separation by g.l.c. gave 23 mg. of ethyl-cis-α-santalate as a light yellow oil and 225.0 mg. of ethyl-trans-α-santalate as a clear oil.

Ethyl trans α-santalate: $[\alpha]_D^{25}$ +32.75°; infrared spectrum:

$\lambda_{max.}^{CCl_4}$ 3.28 (Sh.), 3.37, 3.47 (Sh.), 5.86, 6.08µ n.m.r. spectrum: $\tau_{CDCl_3}$ 9.07 (5H, singlet), 8.91 (3H, singlet), 8.71 (3H, triplet, J=8 c.p.s.), 8.14 (3H, singlet), 5.86 (2H, quartet, J=8 c.p.s.), 3.28 (1H, multiplet, $J_{11,12}$~10 c.p.s.).

Analysis.—Calculated for $C_{17}H_{26}O_2$: C, 77.8; H, 10.0. Found: C, 77.8; H, 9.7.

Ethyl cis α-satalate: $[\alpha]_D^{25}$ +8.17°; infrared spectrum:

$\lambda_{max.}^{CCl_4}$ 3.27 (Sh.), 3.37, 3.46 (Sh.), 5.85, 6.09µ n.m.r. spectrum: $\tau_{CDCl_3}$ 9.18 (5H, singlet), 9.01 (3H, singlet), 8.72 (3H, triplet, J=8 c.p.s.), 8.15 (3H, singlet), 5.85 (2H, quartet, J=8 c.p.s.), 4.16 (1H, multiplet, $J_{11,12}$~8 c.p.s.).

Analysis.—Calculated for $C_{17}H_{26}O_2$: C. 77.8; H, 10.0. Found: C, 77.9; H, 10.0.

A solution of 140 mg. of the ethyl trans α-santalate in 3 ml. of dry diethyl ether was added dropwise to 2 ml. of diethyl ether containing 54 mg. of lithium aluminum hydride. The resulting mixture was stirred under a nitrogen atmosphere for one hour while maintaining the temperature at 25° C. The ether solution was filtered, dried over anhydrous sodium sulfate, again filtered and the ether removed under reduced pressure (20–25 mm.) to produce 117.5 mg. of a clear viscous oil. Analysis of this oil on column B at 203° C. indicated the presence of trans α-santalol (92%, $R_T$ 790 sec.). Further purification and separation by g.l.c. gave 66.1 mg. of pure trans α-santalol as a clear oil: $[α]_D^{25}$ +18.09°; infrared spectrum:

$λ_{max.}^{CCl_4}$ 2.99, 3.27 (Sh.), 3.48, 5.95 (broad and weak) μ n.m.r. spectrum: $τ_{CDCl_3}$ 9.17 (5H, singlet), 9.01 (3H, singlet), 8.33 (3H, singlet), 6.01 (2H, singlet), 4.59 (1H, triplet, $J_{11,12}$=8 c.p.s.); $τ_{CS_2}$ 9.19 (5H, singlet), 9.00 (3H, singlet), 8.42 (3H, singlet), 6.20 (2H, singlet), 4.71 (1H, triplet, $J_{11,12}$=7 c.p.s.).

*Analysis.*—Calculated for $C_{15}H_{24}O$: C, 81.8; H, 11.0. Found: C, 81.8; H, 11.2.

In the above Example I, substantially equivalent results are obtained in that ethyl trans α-santalate and ethyl cis α-santalate are formed when the methylene chloride solvent is replaced by a solvent selected from the group consisting of chloroform and ethylene glycol dimethyl ether.

Also, in the above Example I, substantially equivalent results are obtained in that ethyl trans α-santalate and ethyl cis α-santalate are formed when the (carbethoxyethylidene)-triphenylphosphorane is replaced by a phosphorane selected from the group consisting of (carbomethoxyethylidene)-triphenylphosphorane (whereby the intermediate product is methyl cis and trans α-santalate), (carbopropoxyethylidene)-triphenylphosphorane (whereby the intermediate product is propyl cis and trans α-santalate), (carbobutoxyethylidene) - triphenylphosphorane (whereby the intermediate product is butyl cis and trans α-santalate), and (carbopentoxyethylidene) - triphenylphosphorane (whereby the intermediate product is pentyl cis and trans α-santalate).

EXAMPLE II

Preparation of cis α-santalol

A solution of 1.01 g. of tricycloekasantalal and 6.0 g. of (carbethoxyethylidene)-triphenylphosphorane in 25 ml. of dry methanol was stirred for 16 hours at 26° C. under a nitrogen atmosphere. The methanol was removed under reduced pressure (20–25 mm.). Further purification and separation by g.l.c. gave 223 mg. of ethyl cis α-santalate and 1.07 g. of ethyl trans α-santalate. The analytical data for these compounds were equivalent to that obtained for the same compounds in Example I.

A solution of 99.1 mg. of the ethyl cis α-santalate in 3 ml. of dry diethyl ether was added dropwise to a solution of 30 mg. of lithium aluminum hydride in 3 ml. of diethyl ether. The resulting solution was stirred for one hour under a nitrogen atmosphere while the temperature was maintained at about 25° C. The solution was filtered and dried over sodium sulfate. The ether was removed under reduced pressure (20–25 mm.) to afford 84.3 mg. of a clear viscous oil. Analysis of this oil on column B at 203° C. showed the presence of cis α-santalol (85%, $R_T$ 640 sec.). Further separation, purification and collection by g.l.c. yielded 46.2 mg. of pure cis α-santalol as a clear viscous oil: $[α]_D^{25}$+18.33°; infrared spectrum:

$λ_{amx.}^{CCl_4}$ 2.70, 2.90, 3.23 (Sh.), 3.35, 3.41 (Sh.) μ n.m.r. spectrum: $τ_{CDCl_3}$ 9.18 (5H, singlet), 9.00 (3H, singlet), 8.23 (3H, singlet), 5.90 (2H, singlet), 4.72 (1H, triplet, $J_{11,12}$=8 c.p.s.); $τ_{CS_2}$ 9.20 (5H, singlet), 9.02 (3H, singlet), 8.32 (3H, singlet), 6.05 (2H, singlet), 4.85 (1H, triplet, $J_{11,12}$=8 c.p.s.).

*Analysis.*—Calculated for $C_{15}H_{24}O$: C, 81.8; H, 11.0. Found: C, 81.5; H, 11.1.

In the above Example II, substantially equivalent results are obtained in that ethyl cis α-santalate and ethyl trans α-santalate are formed when the methanol solvent is replaced by a solvent selected from the group consisting of ethanol and dimethylformamide.

A commercially available sample of naturally occurring α-santalol, which had been separated from East Indian sandalwood oil, was obtained from Givaudan-Delawana, Inc. The infrared spectrum, n.m.r. spectrum, and g.l.c. retention time of this material was identical to the same data for the cis α-santalol prepared hereinbefore in Example II.

Additionally, seven commercially available samples of α-santalol from East Indian sandalwood oil and one commercially available sample of α-santalol from Australian sandalwood oil were shown by g.l.c. to be identical to the cis α-santalol prepared hereinbefore in Example II.

EXAMPLE III

Preparation of α-santalol

Ethyl α-santalate prepared in accordance with Example II (comprising a mixture of ethyl trans α-santalate and ethyl cis α-santalate) was twice distilled, B.P. 136–139° C./0.75 mm. To a solution of 309 mg. of lithium aluminum hydride in 20 ml. of diethyl ether, was added dropwise with stirring 1.774 g. of the distilled ethyl α-santalate in 30 ml. of diethyl ether. The resulting mixture was stirred for 1.3 hours at 26° C. under a nitrogen atmosphere. Excess sodium sulfate decahydrate was added to the solution which was then filtered. The ether was removed under reduced pressure (20–25 mm.) to afford a clear oil. This oil was distilled to yield 1.35 g. of distillate, B.P. 113–119° C./0.5 mm. The distillate was analyzed on a EgSSX (10 foot by 0.25 inch) chromatographic column at 180° C. and was shown to contain cis α-santalol (13%, $R_T$ 11 min., 55 sec.) and trans α-santalol (71%, $R_T$ 13 min., 30 sec.).

In the above Example III, substantially equivalent results are obtained in that cis α-santalol and trans α-santalol are formed when the lithium aluminum hydride is replaced by a reducing agent selected from the group consisting of lithium borohydride, aluminum hydride, lithium trimethoxy-aluminohydride, and sodium borohydride-aluminum trichloride.

Also, in the above Example III, substantially equivalent results are obtained when the diethyl ether is replaced by a solvent selected from the group consisting of tetrahydrofuran, ethylene glycol dimethyl ether, diethylene glycol dimethyl ether, and dioxane.

EXAMPLE IV

Perfume compositions

A perfume composition is prepared by intermixing the components shown below:

| Component: | Percent by weight |
|---|---|
| Ethyl cis α-santalate | 3.00 |
| Ethyl trans α-santalate | 3.00 |
| Bergamot | 17.50 |
| Lavender | 55.00 |
| Ionone methyl | 6.00 |
| Oakmoss | 1.00 |
| Patchouli | 1.00 |
| Sandalwood | 1.50 |
| Coumarin | 10.00 |
| Clove | 2.00 |

This composition exhibits a highly desirable and useful odor. A substantially equivalent desirable and useful odor is observed when the ethyl cis α-santalate and ethyl trans α-santalate are respectively replaced by alkyl cis α-santalate and alkyl trans α-santalate wherein alkyl is selected from the group consisting of propyl, butyl, and pentyl.

As discussed hereinbefore alkyl cis α-santalate and alkyl trans α-santalate are useful in various perfume compositions. Thus, the components and proportions in the perfume composition of this example can be adjusted according to methods well known in the perfume art to form a wide variety of desirable perfume compositions containing odoriferously effective amounts of alkyl cis α-santalate and/or alkyl trans α-santalate.

EXAMPLE V
Detergent compositions

A conventional heavy-duty built detergent having the following composition is prepared:

| Ingredient: | Percent by weight |
|---|---|
| Sodium dodecyl benzene sulfonate | 20.00 |
| Sodium tripolyphosphate | 50.00 |
| Sodium silicate | 6.00 |
| Sodium sulfate | 14.00 |
| Water | 9.80 |
| Perfume composition of Example IV (containing 3% ethyl cis α-santalate and 3% ethyl trans α-santalate) | 0.20 |

This detergent composition exhibits a highly desirable odor. The detergent composition exhibits a substantially equivalent desirable odor when the ethyl cis α-santalate and ethyl trans α-santalate are respectively replaced by alkyl cis α-santalate and alkyl trans α-santalate wherein alkyl is selected from the group consisting of propyl, butyl, and pentyl.

Other perfume compositions employing odoriferously effective amounts of alkyl cis α-santalate and/or alkyl trans α-santalate can be substituted for the perfume composition in the detergent composition of this example according to methods well known in the perfume art.

EXAMPLE VI
Detergent bar compositions

A conventional household detergent bar having the following composition is prepared:

| Ingredient: | Percent by weight |
|---|---|
| Sodium soap | 75.00 |
| Potassium soap [1] | 7.50 |
| Water | 15.00 |
| Perfume composition of Example IV (containing 3% ethyl cis α-santalate and 3% ethyl trans α-santalate) | 2.50 |

[1] The total soap comprises a mixture of 80% tallow soap and 20% coconut soap.

This detergent bar exhibits a highly desirable odor. The detergent bar exhibits a substantially equivalent desirable odor when the ethyl cis α-santalate and ethyl trans α-santalate are respectively replaced by alkyl cis α-santalate and alkyl trans α-santalate wherein alkyl is selected from the group consisting of propyl, butyl, and pentyl.

Other perfume compositions employing odoriferously effective amounts of alkyl cis α-santalate and/or alkyl cis α-santalate can be substituted for the perfume composition in the detergent bar of this example according to methods well known in the perfume art.

What is claimed is:
1. A process for preparing α-santalol, which comprises:
  (A) reacting tricycloekasantalal with a phosphorane having the general formula

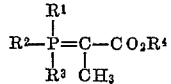

wherein $R^1$, $R^2$ and $R^3$ are each selected from the group consisting of alkyl, aryl, alkylaryl, arylalkyl, alkoxy, and aryloxy radicals containing from 1 to about 20 carbon atoms, wherein the total number of carbon atoms in $R^1$, $R^2$ and $R^3$ is less than about 30; and wherein $R^4$ is an alkyl radical containing from 1 to 5 carbon atoms; to form alkyl α-santalate; and
  (B) reacting the alkyl α-santalate with a reducing agent to form α-santalol.

2. The process of claim 1 wherein:
  (A) the tricycloeksantalal is reacted with a (carboalkoxyethylidene)-triarylphosphorane to form alkyl α-santalate, said reaction being carried out in a solvent selected from the group consisting of methylene chloride and methanol; and
  (B) the alkyl α-santalate is reacted with a reducing agent selected from the group consisting of lithium aluminum hydride, lithium borohydride, aluminum hydride, lithium trimethoxyaluminohydride, and sodium borohydride-aluminum trichloride, said reduction being carried out in a solvent selected from the group consisting of tetrahydrofuran, diethyl ether, ethylene glycol dimethyl ether, diethylene glycol dimethyl ether and dioxane, to form α-santalol.

3. The process of claim 2 wherein said phosphorane is (carbethoxyethylidene)-triphenylphosphorane.

4. The process of claim 2 wherein said reducing agent is lithium aluminum hydride.

5. A process for preparing trans α-santalol, which comprises the steps of:
  (A) reacting tricycloekasantalal with a (carboalkoxyethylidene)-triphenylphosphorane in a solvent selected from the group consisting of methylene chloride, chloroform, and ethylene glycol dimethyl ether to form alkyl trans α-santalate;
  (B) separating the alkyl trans α-santalate from the reaction mixture; and
  (C) reacting the alkyl trans α-santalate with lithium aluminum hydride in a solvent selected from the group consisting of tetrahydrofuran and diethyl ether, to form trans α-santalol.

6. The process of claim 5 wherein said (carboalkoxyethylidene) - triphenylphosphorane is (carbethoxyethylidene)-triphenylphosphorane.

7. A process for preparing cis α-santalol, which comprises the steps of:
  (A) reacting tricycloekasantalal with (carboalkoxyethylidene)-triphenyl-phosphorane in a solvent selected from the group consisting of methanol, ethanol, and dimethylformamide, to form alkyl cis α-santalate;
  (B) separating the alkyl cis α-santalate from the reaction mixture; and
  (C) reacting the alkyl cis α-santalate with lithium aluminum hydride in a solvent selected from the group consisting of tetrahydrofuran and diethyl ether, to form cis α-santalol.

8. The process of claim 7 wherein said (carboalkoxyethylidene) - triphenylphosphorane is (carbethoxyethylidene)-triphenylphosphorane.

References Cited

Guha, P. C., and Bhattacharyya, S. C.: Indian Chemical Society Journal, vol. 21, p. 333, 1944.

Bhattacharyya, S. C.: Ibid. p. 337.

LORRAINE A. WEINBERGER, Primary Examiner

P. J. KILLOS, Assistant Examiner

U.S. Cl. X.R.

252—121, 522; 260—468